United States Patent [19]
Matthews et al.

[11] Patent Number: 6,101,601
[45] Date of Patent: Aug. 8, 2000

[54] METHOD AND APPARATUS FOR HIBERNATION WITHIN A DISTRIBUTED DATA PROCESSING SYSTEM

[75] Inventors: Gareth Christopher Matthews, Cedar Park; David Medina, Austin; Allen Chester Wynn, Round Rock, all of Tex.

[73] Assignee: International Business Machines Corporation, Armonk, N.Y.

[21] Appl. No.: 09/062,885

[22] Filed: Apr. 20, 1998

[51] Int. Cl.[7] .................................................. G06F 17/30
[52] U.S. Cl. .................................. 713/2; 714/15; 707/10
[58] Field of Search .......................... 707/10; 713/2; 714/15

[56] References Cited

U.S. PATENT DOCUMENTS

| | | | |
|---|---|---|---|
| 4,885,770 | 12/1989 | Croll | 379/269 |
| 5,146,568 | 9/1992 | Flaherty et al. | 395/500.45 |
| 5,367,688 | 11/1994 | Croll | 713/2 |
| 5,444,850 | 8/1995 | Chang | 709/222 |
| 5,452,454 | 9/1995 | Basu | 713/2 |
| 5,675,800 | 10/1997 | Fisher, Jr. et al. | 713/2 |
| 5,708,820 | 1/1998 | Park et al. | 713/323 |
| 5,822,582 | 10/1998 | Doragh et al. | 713/2 |
| 5,845,292 | 12/1998 | Bohannon et al. | 707/202 |

Primary Examiner—Thomas G. Black
Assistant Examiner—William Trinh
Attorney, Agent, or Firm—Duke W. Yee; Jeffret S. LaBaw

[57] ABSTRACT

A method and apparatus provides initializing a data processing system within a distributed data processing system. The data processing system receives data wherein the data is used to initialize the data processing system. The data processing system saves an image within the data processing system in a selected state after initialization of the data processing system, wherein the image is a saved image. The data processing system restores to the state using the saved image.

28 Claims, 5 Drawing Sheets

METHOD AND APPARATUS FOR HIBERNATION WITHIN A DISTRIBUTED DATA PROCESSING SYSTEM

BACKGROUND OF THE INVENTION

1. Technical Field

The present invention relates to an improved distributed data processing system and in particular to an improved method and apparatus for managing data processing systems within a distributed data processing system. Still more particularly, the present invention provides an improved method and apparatus for booting data processing systems within a distributed data processing system.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program which controls the actual computer or central processing unit (CPU), and device drivers which control the input and output devices (I/O) such as printers and terminals.

A general purpose computer is fairly complicated. Usually a queue of application programs is present waiting to use the CPU. The operating system will need to determine which program will run next, how much of the CPU time it will be allowed to use and what other computer resources the application will be allowed to use. Further, each application program will require a special input or output device and the application program must transfer its data to the operating system which controls the device drivers.

When a computer is booted, a boot program stored in a read only memory (ROM) is used to initiate loading of the operating system onto the computer's memory. The term "boot" refers to the process of starting or resetting a computer. When first turned on (cold boot) or reset (warm boot), the computer executes the software that loads and starts the computer's more complicated operating system and prepares it for use. Thus, the computer can be said to pull itself up by its own bootstraps. The boot program instructs the computer where to find a larger boot program also called a "boot block" data program, which is used to load the operating system onto the computer. The term "boot block" refers to a portion of a disk that contains the operating-system loader and other basic information that enables a computer to start up. In stand-alone computers, the boot block program and the operating system are found on a local hard drive.

A network containing a number of computers may be formed by having these computers, also referred to as "nodes" or "network computers", communicate with each other over one or more communications links, which is an aggregation which is a computer network. Today, many computer work stations are connected to other work stations, file servers, or other resources over a local area network (LAN). Each computer on a network is connected to the network via an adapter card or other similar means, which provides an ability to establish a communications link to the network.

In managing network computers (NCs), it is desirable to maintain uniformity of programs, operating systems, and configurations among the different NCs. In maintaining uniformity, a technique of using remote boot operations may be employed to support NCs in a network environment. In such a case, each network computer (NC) is booted from a remote boot disk or other device located elsewhere on the network, such as on a server or a disk array system connected to the network. Such a boot system also provides for minimizing the amount of time needed to update individual NCs because system administrators do not have to physically reconfigure or change applications at each NC. Additionally, the remote boot processes provide support for completely diskless NCs. Furthermore, the remote boot process enhances software and network security because the remote boot files may be kept in a secure location and copies do not need to be distributed among NCs in the network.

One problem with remote booting is that at boot time, the time needed to boot an individual NC may take a longer period of time than desired because the boot image is transferred over the network and only a limited number of NCs can boot at a time. For example, booting an NC may take fifteen or more minutes depending on, for example, network traffic, image size, and initialization time. This problem is exasperated in which a network is shut down unexpectedly and is started again. When the network is brought up or restarted, boot storms may occur in which all of the NCs will be booting and loading applications from the network. This situation may result in severe bandwidth problems and greatly increases the time needed to boot the NCs because all of the NCs are attempting to download operating systems and applications from the network.

In many office environments, such a delay in booting or storing NCs is unacceptable. For example, in a banking office environment, having a customer wait for fifteen or more minutes before a transaction can occur is unacceptable as a business practice. This situation, however, occurs when an NC used for customer transactions has been shut down unexpectedly and is rebooted.

Therefore, it would be advantageous to have an improved method and apparatus for booting and rebooting a network computer connected to a network.

SUMMARY OF THE INVENTION

It is one object of the present invention to provide an improved distributed data processing system.

It is another object of the present invention to provide an improved method and apparatus for managing data processing systems within a distributed data processing system.

It is yet another object of the present invention to provide an improved method and apparatus for booting data processing systems within a distributed data processing system.

The present invention provides a method for initializing a data processing system within a distributed data processing system. The data processing system receives data wherein the data is used to initialize the data processing system. The data processing system saves an image within the data processing system in a selected state after initialization of the data processing system, wherein the image is a saved image. The data processing system restores to the state using the saved image.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
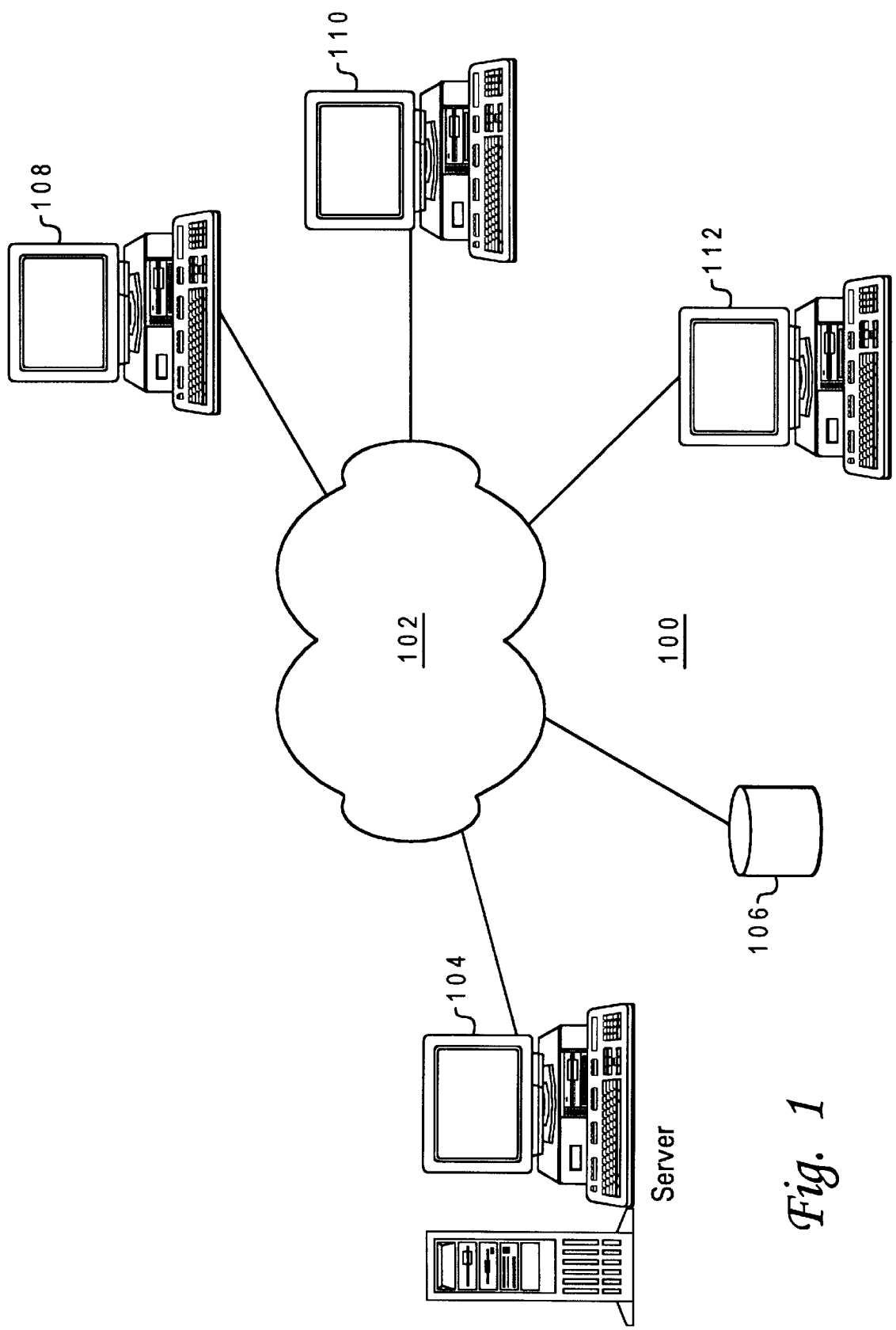
FIG. 1 is a diagram of a distributed data processing system in accordance with a preferred embodiment of the present invention.

With reference now to the figures, and in particular with reference to FIG. 1, a diagram of a distributed data processing system is depicted in accordance with a preferred embodiment of the present invention. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, network computers (NCs) 108, 110, and 112 also are connected to network 102. For purposes of this application, a network computer is any computer, coupled to a network, which receives a boot image from another computer coupled to the network and also may be a server managed computer. Server 104 provides data, such as boot files, operating system images, and applications to NCs 108–112. NCs 108, 110, and 112 are clients to server 104. Distributed data processing system 100 may include additional servers, NCs, and other devices not shown. FIG. 1 is intended as an example, and not as an architectural limitation for the processes of the present invention.

Figure 2:
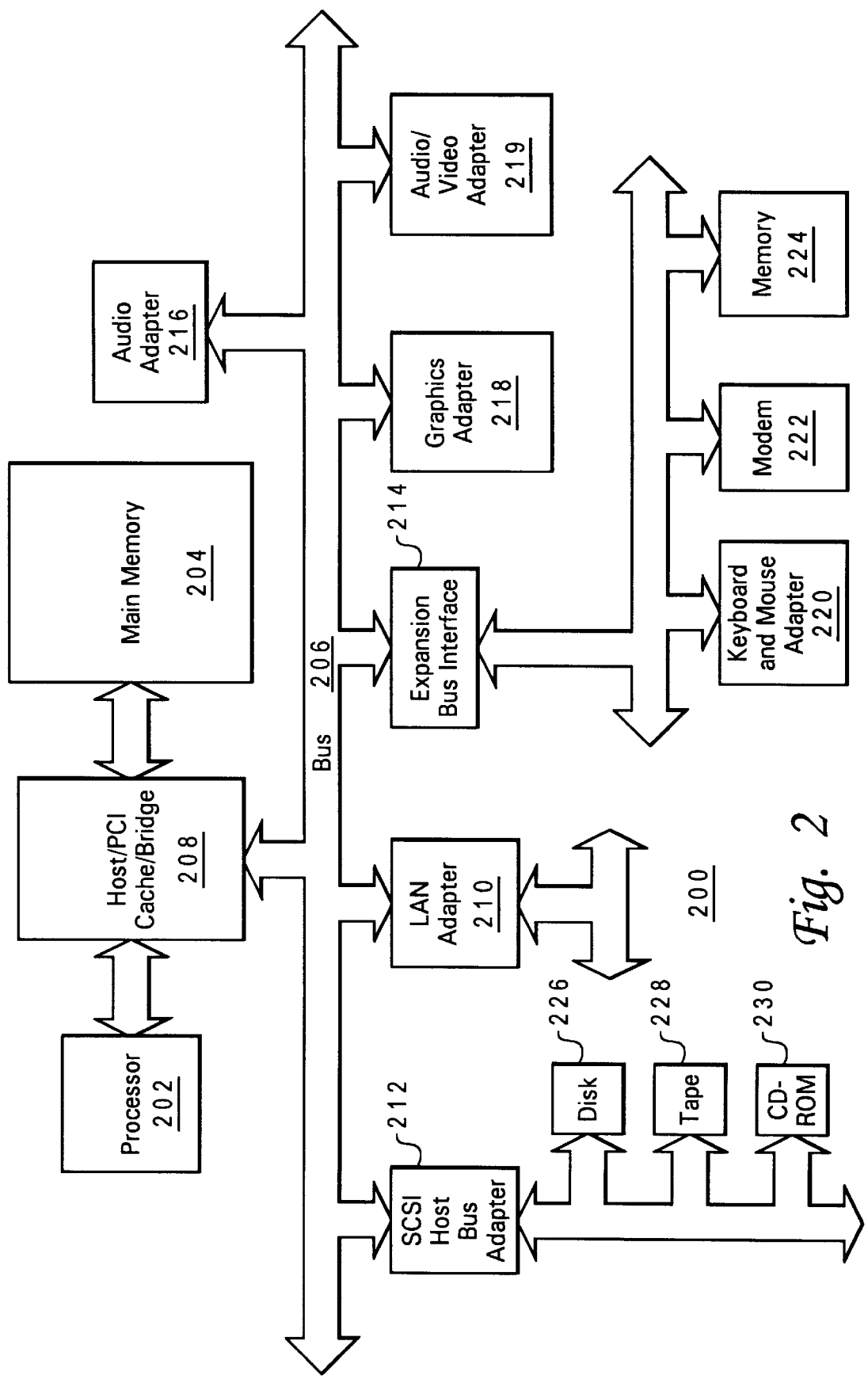
FIG. 2 is a block diagram of a data processing system in which the present invention may be implemented.

Turning next to FIG. 2, a block diagram of a data processing system 200 in which the present invention may be implemented is illustrated. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors. The depicted example includes four loads on the motherboard and three expansion slots.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. Implemented as an NC, data processing system 200 may include fewer components than illustrated in FIG. 2. For example, many NCs may be diskless or have only a single storage device, such as hard disk drive 226. Data processing system 200 also may be implemented as a server. The depicted example is not meant to imply architectural limitations with respect to the present invention.

Figure 3:
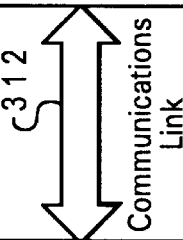
FIG. 3 is a block diagram of components used in managing a network computer in accordance with a preferred embodiment of the present invention.

The present invention provides a method and system for minimizing boot time for NCs in a distributed data processing system. Turning next to FIG. 3, a block diagram of components used in managing a network computer is depicted in accordance with a preferred embodiment of the present invention. In FIG. 3, server 300 downloads a remote NC boot image 302 from a number of boot images 302–308 located within server 300 to NC 310 over communications link 312. Thereafter, NC 310 is hibernated by the server in a known or selected state to produce an image 314, which may be used to restart NC 310, when NC 310 is restarted causing unhibernation. Hibernation involves saving the state of a computer, such as an NC. Hibernation is implementation specific and the data may be saved in a file or raw I/O format located on a storage device, such as a hard disk drive or a static RAM. Alternatively, instead hibernating NC 310 immediately after initialization, an image 314 may be created and saved at a later time or a selected state after selected applications or options have been started. Depending on the implementation, hibernation may be performed periodically. This state may be one after selected applications have been initiated, but before personal preferences in the case of multiple users of an NC. Hibernation may include various functions. First is an emergency automatic data recovering function in which data of a computer is stored in a supplementary memory device such as a hard disk for recovery purposes, e.g., when the power supply is cut off because of a power failure, a mistake by a server or in response to a command by a user. Thereafter, such data is recovered and the computer is restored to its former state; e.g., before the power failure when the power is supplied to the computer again. Second is a power saving function in which the computer is not in use for a given time while using the computer, the power supply is automatically cut off after data of the computer is stored in a supplementary memory device, and thereafter, such data is recovered and the computer is restored to its former state when the power is re-supplied to the computer. The depicted example employs the first function used in case of power failure or in the instance that a user has restarted or turned on an NC.

Image 314 of NC 310 is stored off to a storage device, such as a disk, firmware, or some other media located within the NC 310 or attached directly to NC 310 for the next time that the NC boots. Typically, NC 310 will query the server to determine whether it should unhibernate locally or download the boot image using the network mechanism. A boot image is an operating system image sent to the NC in contrast to a hibernated image, which is a reduced working set of the operating system stored at a known state. In the depicted example, NC 310 checks NC file or registry 316, located on server 300 to determine whether to boot or unhibernate from the locally stored image on NC 310 or to download the boot image from server 300. This check is part of NC 310's initial boot program. NC file 316 will include information on the location of the hibernated image on NC 310. This location image is used by NC 310 to unhibernate locally.

In the depicted example, if this information is missing from server 300, NC 310 will then perform a normal remote boot, downloading the boot image and other information from server 300. Alternatively, information may be present that affirmatively instructs NC 310 to perform a normal remote boot. A normal boot is typically performed because the local boot image is outdated or the server wants to rehibernate. In addition, either or both boot images 302–308 and NC file 316 may be stored elsewhere in the distributed data processing system, such as a storage unit (i.e. storage unit 106 in FIG. 1). This process allows the server to maintain client management of client NCs. In addition, the load of the image is fast because all of the images are local and the machine state is predetermined in the hibernation image (i.e. the applications and operating system that are in the image have already been initialized). Depending upon the implementation, incremental hibernation may occur. An instance may occur in which part of the image on the local NC is outdated, but most of the information is still valid. In this case, a server may send a message indicating that portions of the local boot image may be used except for a new portion, which is sent with the message or referenced by the message.

Figure 4:
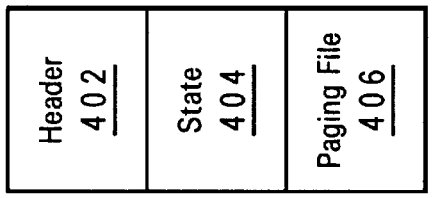
FIG. 4 is a diagram of an image in accordance with a preferred embodiment of the present invention.

In FIG. 4, a diagram of an image is depicted in accordance with a preferred embodiment of the present invention. Image 400 is an image that is used to restart or unhibernate an NC. Image 400 is stored locally within an NC to a storage device directly connected to the NC in the depicted example. Image 400 includes header information 402, state information 404, and paging file information 406. Header information 402 describes the file layout and loading information for the hibernated image on the NC, while state information 404 contains the state of the physical memory and hardware devices within the NC (i.e. devices used by the operating system, interrupts, and real time clock).

Image 400 will include paging file information 406 only for systems involving virtual memory management. Paging file information within image 400 may be the paging file itself. Alternatively, a part of the paging file may be frozen or locked from changes in which the locked portion of the paging file contains information needed to restore, boot, or unhibernate the NC. Although the depicted example employs a paging file, a paging space may be used in place of a paging file depending on the type of operating system. A paging space or paging file is applicable to systems with virtual memory managers.

Figure 5:
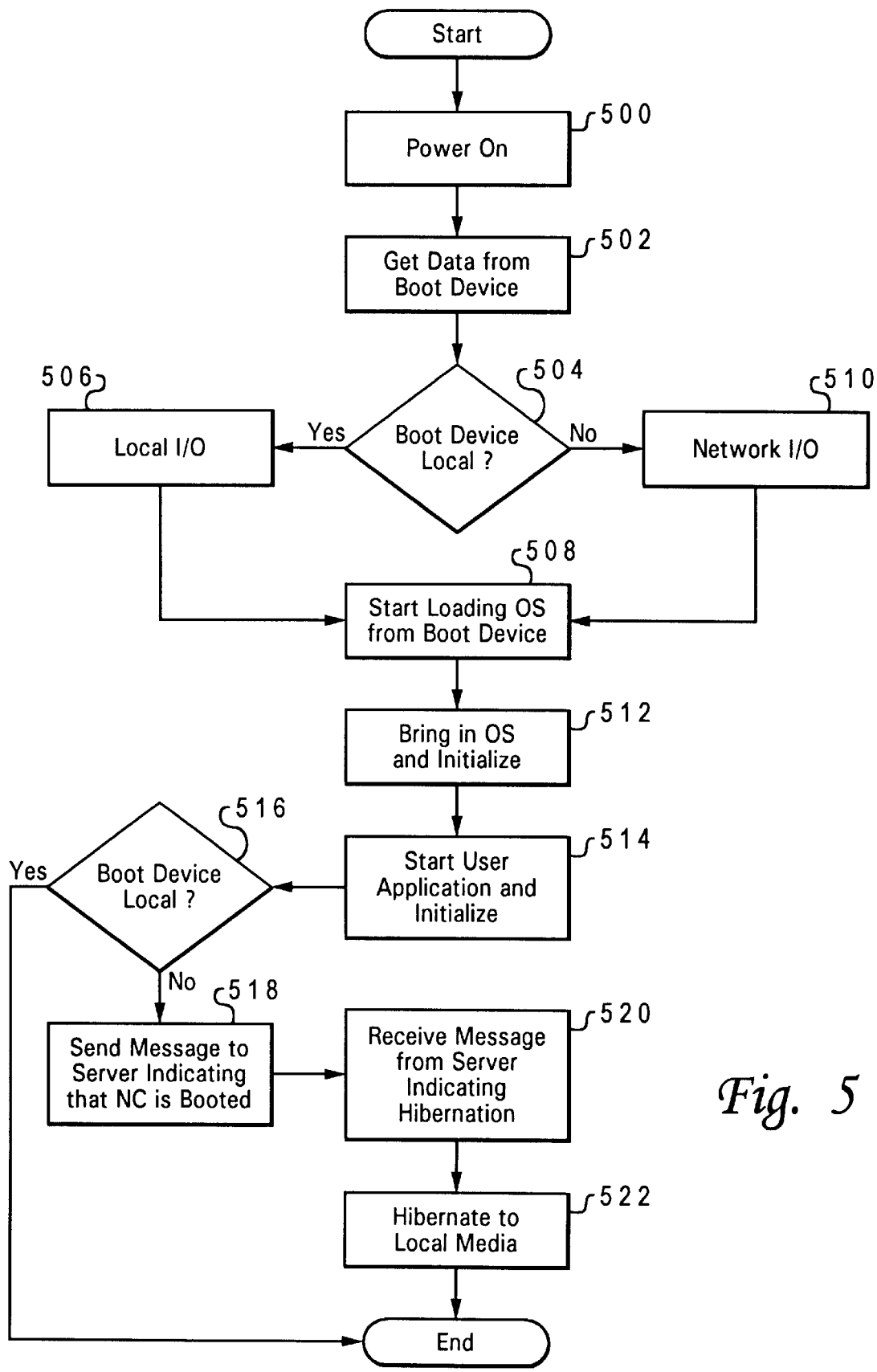
FIG. 5 is a flowchart of a process for configuring a network computer for hibernation in accordance with a preferred embodiment of the present invention.

With reference now to FIG. 5, a flowchart of a process for configuring a network computer for hibernation in accordance with a preferred embodiment of the present invention. This figure illustrates the process used in a remote or network boot to save information necessary for local booting of the network computer. The process begins by the power being turned on by the NC (step 500). Thereafter, data is obtained from a boot device (step 502). A boot device is a device that stores the initial program load information and may be, for example, a hard drive or firmware. A determination is made as to whether this boot device is a local boot device (step 504). If the boot device is a local device, local I/O is used (step 506) with the process then loading the operating system from the boot device (step 508). With reference again to step 504, if the boot device is not local, network I/O is used to obtain data for initializing the network computer (step 510) with the process then proceeding to step 508 as described above. The operating system is then completely loaded and initialized (step 512).

Thereafter, user applications are started and initialized (step 514). This does not preclude the segregation of operating systems versus applications being bifurcated in which one may be hibernated while the other is delivered by the server. In the depicted example, booting the NC includes initializing selected applications. When the NC has finished booting, a determination is then made as to whether the boot device is local (step 516). If the boot device is not a local device, the NC then sends a message to the server indicating that the NC has been booted (step 518). In the instance of a local boot, the NC will still send an indication back to the server that the system has been rebooted. Thereafter, the NC receives a message from the server to hibernate or store an image for hibernation (step 520) and hibernates an image to local media (step 522) with the boot process terminating thereafter. Alternatively, depending on the implementation, the hibernation of the image can be triggered by a local user action such as opening a new application or a local timer which periodically hibernates an image from time to time. The NC can continue running after hibernation of the image has occurred. With reference again to step 516, if the boot device is local, the process then terminates with the NC continuing to operate and process user input.

Figure 6:
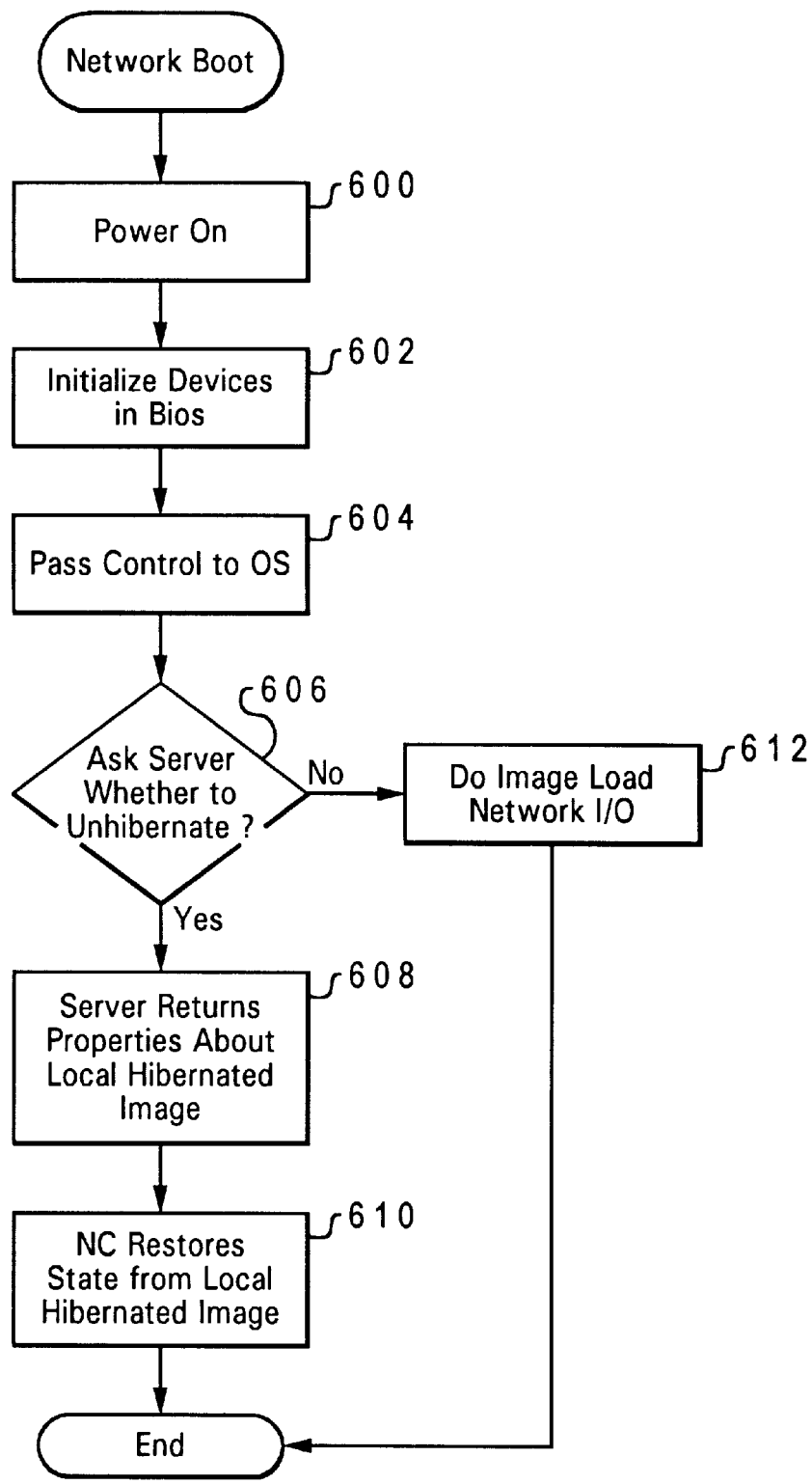
FIG. 6 is a flowchart of a process for booting a network computer in accordance with a preferred embodiment of the present invention.

With reference now to FIG. 6, a flowchart of a process for booting a network computer is depicted in accordance with a preferred embodiment of the present invention. Process begins with a system event such as the power being turned on at the network computer (step 600). Thereafter, devices are initialized in the BIOS (step 602), and control is passed to the operating system (step 604). The network computer then polls the server to determine whether to unhibernate (step 606). The polling may be accomplished using a known network protocol. Unhibernate means to restore the stored state of the system back to the physical state, e.g. restore device states, load physical memory, and set paging space back to pre-hibernated state. If the NC is to unhibernate locally, the server returns information describing properties and location of the hibernated image (step 608). Examples of criteria that may be used by a server to determine whether unhibernate locally or to use an image from the server include the addition of new devices to the hardware, changes in applications used by the network computer, or updates to operating systems. The network computer then restores itself to the desired state from the local hibernation image (step 610), with the boot process terminating thereafter.

With reference again to step 606, if the server indicates that a normal network boot is to be employed, normal network I/O occurs to remotely boot the NC (step 612) with the boot process terminating thereafter. The server may indicate that a normal network boot is to be employed in order to download new data, such as, for example, updated operating systems, applications, or configurations. Additionally, new applications may be loaded from the server to the NC. After a normal network boot, the NC may then be instructed to save an image of the system for hibernation using the processes of the present invention.

The locally hibernated image provides a faster initialization of the NC than a remote boot from the network. This process is faster than booting locally because the NC is restored to a selected state, rather than having to load and initialize the operating system, device drivers, and applications.

Thus, the present invention provides an improved method and apparatus for restoring a network computer. This advantage is provided by taking a "snapshot" of the system, including the state of the hardware, physical memory, and various software components within the NC. The present invention also either stores a copy of a paging file or locks a portion of the paging file in the desired state for machines that allow virtual paging. This image or "snapshot" of the NC is stored off a disk, firmware, or any other media local to the NC. The NC then may be restored or placed in the desired state by loading the image, rather than having to initialize itself by remote booting or locally initializing itself. In this manner, bottlenecks or "boot storms" may be avoided when NCs are initialized or booted within a distributed data processing system. Also, the present invention allows the server to maintain client management of the various NCs.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disk, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the processes of the present invention are not network protocol sensitive and may be applied to many types of distributed data processing systems. The embodiment was chosen and described in order to best explain the principles of the invention the practical application to enable others of ordinary skill in the art to understand the invention for various embodiments with various modifications as are suited to the particular use contemplated.

What is claimed is:

1. A method for utilizing a data processing system within a distributed data processing system, the method comprising:

receiving data at the data processing system from a remote network source, wherein the data is used to initialize the data processing system;

saving an image of the data processing system within the data processing system in a selected state after initialization of the data processing system, wherein the image is a saved image;

querying a server in the distributed data processing system to determine whether to restore the data processing system using the saved image; and restoring the data processing system to the selected state using the saved image in response to a determination that the saved image should be used to restore the data processing system to the selected state.

2. The method of claim 1, wherein the data received by the data processing system is a boot image.

3. The method of claim 1, wherein the data processing system includes physical memory and wherein the saved image includes information about a state of the physical memory.

4. The method of claim 1, wherein the distributed data processing system includes a server and further comprising:

initializing the data processing system using a boot image from the server in response to a determination that the saved image is not to be used to restore the data processing system to the selected state.

5. The method of claim 1, wherein the data processing system in the selected state includes an operating system and a plurality of applications and wherein the operating system and the plurality of applications located in a memory of the data processing system are stored within the saved image.

6. The method of claim 5, wherein a paging file is stored within the saved image if virtual memory is present.

7. The method of claim 1 further comprising:

starting the data processing system using a boot image in response to a determination that the saved image is to be unused to restore the data processing system to the selected state.

8. The method of claim 7, wherein the boot image is located in one of a local storage in the data processing system and a server.

9. A data processing system comprising:

a bus;

an adapter configured for connection to a network;

a storage device; and a processing unit, wherein the processing unit executes instructions to initialize the data processing system, hibernate the data processing system after initialization of the data processing system to create an image of the data processing system in a selected state, query a server to determine whether to restore the data processing system to the selected state using the image in response to restarting the data processing system, and restore the data processing system to the selected state using the image in response to an indication that the image is to be used to restore the data processing system.

10. A data processing system comprising:

reception means for receiving data at the data processing system, wherein the data is used to initialize the data processing system;

storage means for saving an image of the data processing system within the data processing system in a selected state after initialization of the data processing system, wherein the image is a saved image;

querying means for querying a server in the distributed data processing system to determine whether to restore the data processing system using the saved image; and restoration means for restoring the data processing system to the state using the saved image in response to a determination that the saved image should be used to restore the data processing system to the selected state.

11. The data processing system of claim 10, wherein the data received by the data processing system is a boot image.

12. A distributed data processing system comprising:

a server computer, wherein the server computer contains initialization data;

a plurality of client computers, wherein a client computer within the plurality of client computers receives the initialization data from the server computer, initializes to a selected state using the initialization data, stores an image of the selected state within the client computer, querying the server computer to determine whether to use the saved image in response to starting the client computer, and restores the client computer to the selected states using the image in response to a determination that the saved image is to be used.

13. The data processing system of claim 9, wherein the data processing system is connected to a server and further comprising:

initialization means for initializing the data processing system using a boot image from the server in response to a determination that the saved image is not to be used to restore the data processing system to the selected state.

14. The data processing system of claim 12, wherein the data processing system in the state includes an operating system and a plurality of applications and wherein the operating system and the plurality of applications are stored within the saved image.

15. The data processing system of claim 14, wherein a paging file is store within the saved image.

16. The data processing system of claim 12, wherein the data processing system includes physical memory and wherein the saved image includes information about a state of the physical memory.

17. The distributed data processing system of claim 12, wherein the client computer is initialized using a boot image in response to a determination that the saved image is to be unused in starting the client computer.

18. The distributed data processing system of claim 17, wherein the boot image is stored in one of a local storage in the client computer and the server computer.

19. A computer program product in a computer usable medium for use with a data processing system for initializing a data processing system, the computer program product comprising:

first instructions for receiving data at the data processing system, wherein the data is used to initialize the data processing system;

second instructions for saving an image of the data processing system within the data processing system in a state after initialization of the data processing system, wherein the image is a saved image;

third instructions for querying a server in the distributed data processing system to determine whether to restore the data processing system using the saved image; and fourth instructions for restoring the data processing system to the state using the saved image in response to a determination that the saved image should be used to restore the data processing system to the selected state.

20. The computer program product of claim 19 wherein the second instruction are invoked in response to in response to a timer at the data processing system.

21. The computer program product of claim 19 wherein the second instructions are invoked in response to user actions at the data processing system.

22. The computer program product of claim 19 further comprising:

fifth instruction means for initializing the data processing system using a boot image from a server in response to a determination that the saved image is not to be used to restore the data processing system to the selected state.

23. The computer program product of claim 22 further comprising:

sixth instruction means for informing the data processing system that a portion of the saved image is to be used for initializing the data processing system and new initialization data; and seventh instruction means for initializing the data processing system using the portion of the saved image and the new initialization data.

24. A method in a data processing system for initializing the data processing system, the method comprising:

initializing the data processing system;

hibernating the data processing system after initialization of the data processing system to create an image of the data processing system in a selected state;

querying a server to determine whether to restore the data processing system to the selected state using the image in response to restarting the data processing system; and restoring the data processing system to the selected state using the image in response to an indication that the image is to be used to restore the data processing system.

25. The method of claim 24 further comprising:

initializing the data processing system in response to a determination that the image is to be unused to restore the data processing system.

26. The method of claim 25, wherein the data processing system is initialized using one of a boot image received from the server and a boot image stored locally in the data processing system.

27. A data processing system comprising:

initializing means for initializing the data processing system;

hibernating means for hibernating the data processing system after initialization of the data processing system to create an image of the data processing system in a selected state;

querying means for querying a server to determine whether to restore the data processing system to the selected state using the image in response to restarting the data processing system; and restoration means for restoring the data processing system to the selected state using the image in response to an indication that the image is to be used to restore the data processing system.

28. A computer program product in a computer readable medium for initializing the data processing system, the computer program product comprising:

first instructions for initializing the data processing system;

second instructions for hibernating the data processing system after initialization of the data processing system to create an image of the data processing system in a selected state;

third instructions for querying a server to determine whether to restore the data processing system to the selected state using the image in response to restarting the data processing system; and fourth instructions for restoring the data processing system to the selected state using the image in response to an indication that the image is to be used to restore the data processing system.

* * * * *